(12) United States Patent
Shimodaira

(10) Patent No.: US 8,086,023 B2
(45) Date of Patent: Dec. 27, 2011

(54) DEFECT DETECTION APPARATUS, DEFECT DETECTION METHOD AND COMPUTER PROGRAM

(75) Inventor: Masato Shimodaira, Osaka (JP)

(73) Assignee: Keyence Corporation, Osaka (JP)

( * ) Notice: Subject to any disclaimer, the term of this patent is extended or adjusted under 35 U.S.C. 154(b) by 482 days.

(21) Appl. No.: 12/352,717

(22) Filed: Jan. 13, 2009

(65) Prior Publication Data
US 2009/0202135 A1 Aug. 13, 2009

(30) Foreign Application Priority Data
Feb. 7, 2008 (JP) ................. 2008-027143

(51) Int. Cl.
*G06K 9/00* (2006.01)
(52) U.S. Cl. ....................................... 382/149
(58) Field of Classification Search ............... None
See application file for complete search history.

(56) References Cited

U.S. PATENT DOCUMENTS
6,222,935 B1 * 4/2001 Okamoto ................. 382/149
7,365,324 B2 * 4/2008 Noji et al. ................. 250/310

FOREIGN PATENT DOCUMENTS
| JP | 2000-055827 | 2/2000 |
| JP | 2001-175865 | 6/2001 |
| JP | 2001-317927 | 11/2001 |
| JP | 2003-311464 | 11/2003 |

\* cited by examiner

*Primary Examiner* — Tu Nguyen
(74) *Attorney, Agent, or Firm* — Kilyk & Bowersox, P.L.L.C.

(57) ABSTRACT

There are provided a defect detection apparatus, a defect detection method, and a computer program, which are capable of setting an appropriate reference line with respect to a plurality of edge points, to accurately detect a defect based upon a difference of each edge point, and in which a plurality of edge points are detected from an image including an edge of the object, a representative edge point representing the edge points present within a reference range having a prescribed width is calculated in each shifted position of the reference range while the reference range is sequentially shifted, residuals between a plurality of calculated representative edge points and corresponding edge points are calculated, a position and a size of the defect are specified based upon the calculated residuals, and the residuals are weighted and a representative edge point is repeatedly calculated, to obtain an apparent approximate curve (representative-edge-point sequence).

13 Claims, 12 Drawing Sheets

DEFECT DETECTION APPARATUS, DEFECT DETECTION METHOD AND COMPUTER PROGRAM

CROSS-REFERENCE TO RELATED APPLICATIONS

The present application claims foreign priority based on Japanese Patent Application No. 2008-027143, filed Feb. 7, 2008, the contents of which is incorporated herein by reference.

BACKGROUND OF THE INVENTION

1. Field of the Invention

The present invention relates to a defect detection apparatus, a defect detection method and a computer program, which are capable of setting a reference line with respect to a plurality of edge points having connectivity, to accurately detect a defect such as a burr or a crack based upon a difference of each edge point from the reference line.

2. Description of the Related Art

Conventionally, in a case of detecting the presence of a defect such as a burr or a crack from an picked-up image, for example as for an object having an edge in curved shape, a plurality of edge points are acquired at fixed intervals or fixed angles along the edge, to calculate a free curve enveloping an acquired edge-point sequence. Subsequently, a difference between the calculated free curve and each of the acquired edge points is obtained, and a characteristic amount such as a width, a height, and an area of the defect is obtained, to determine the presence or absence of a burr, a crack or the like.

For example, Japanese Patent Application Laid-Open No. 2001-175865 discloses an image processing method in which a teaching image having been registered in advance and a picked-up image are compared with each other to determine, by use of a difference value obtained by multiplication by deviation data of each pixel, that a portion larger than a prescribed threshold is a defect. Further, Japanese Patent Application Laid-Open No. 2000-055827 discloses a method for inspecting an opening of a glass container or the like, in which a portion with a differential value larger than a prescribed value is determined as a defect based upon differential information of a projection signal.

Further, Japanese Patent Application Laid-Open Nos. 2001-317927 and 2003-311464 disclose inspection methods in which an approximate straight line (Japanese Unexamined Patent Publication No. 2001-317927) or an approximate circle (Japanese Unexamined Patent Publication No. 2003-311464) is calculated by making regression analysis on an edge-point sequence, to detect the presence of a defect based upon a difference from the calculated approximate straight line or the approximate circle.

SUMMARY OF THE INVENTION

However, there has been a problem in the image processing method disclosed in Japanese Patent Application Laid-Open No. 2001-175865 in that accurate positioning of the teaching image and the picked-up image is required, causing lower accuracy in defect determination in regard to an object such as one with its shape subtly changing. Further, there has been a problem in the inspection method disclosed in Japanese Patent Application Laid-Open No. 2000-055827 in that, even when the presence of the defect is detected, the width, size, and the like of the defect cannot be accurately specified due to the use of differential information in the determination.

Further, there has been a problem in the inspection methods disclosed in Japanese Patent Application Laid-Open Nos. 2001-317927 and 2003-311464 in that, although defect determination can be made with accuracy on a specific shape such as a straight line or a circular, the determination cannot be made on an object having the shape of a free curve.

The defect determination on the object having the shape of a free curve requires obtaining an N-order approximate curve and determination of the presence of a defect by use of differences between the obtained approximate curve and the edge points. However, in a case of an object having a complex shape, appropriate setting of an order N of the approximate curve is difficult, and in a case of an object including different shapes of curves, an appropriate order is different in each portion, thereby causing another problem of preventing an appropriate approximate curve from being obtained.

The present invention has been made in view of the above circumstances, and has an object to provide a defect detection apparatus, a defect detection method, and a computer program, which are capable of setting an appropriate reference line with respect to a plurality of edge points even in a case of an object having a complex shape, to accurately detect a defect such as a burr or a crack based upon a difference of each edge point from the reference line.

In order to achieve the above object, a defect detection apparatus according to a first aspect of the invention is a defect detection apparatus which detects a defect based upon an image including an edge of an object as an inspection object, including: an edge-point detecting device for detecting a plurality of edge points from an image including an edge of part or the whole of the object as the inspection object; a representative-edge-point calculating device for calculating a representative edge point representing the plurality of edge points present within a reference range having a previously set prescribed width in each shifted position of the reference range, while sequentially shifting the reference range; a residual calculating device for calculating residuals between a plurality of calculated representative edge points and corresponding edge points; and a defect specifying device for specifying a position and a size of the defect based upon the calculated residuals.

Further, a defect detection apparatus according to a second aspect of the invention includes, in the first aspect, a first display device for overlapping and displaying, on the same positional coordinates, all the edge points detected by the edge-point detecting device and all the corresponding representative edge points.

Further, a defect detection apparatus according to a third aspect of the invention includes, in the first aspect, a second display device for displaying the residuals calculated by the residual calculating device.

Further, a defect detection apparatus according to a fourth aspect of the invention includes, in the first aspect, a weighting factor calculating device for calculating weighting factors to be allocated to the edge points based upon the residuals calculated by the residual calculating device.

Further, a defect detection apparatus according to a fifth aspect of the invention is characterized in that in the fourth aspect, the weighting factor calculating device is configured such that the larger (smaller) the residual is, the smaller (larger) weighting factor is calculated.

Further, a defect detection apparatus according to a sixth aspect of the invention is characterized in that in the fourth aspect, the representative-edge-point calculating device is configured to recalculate the representative edge point based upon the weighting factor calculated by the weighting factor calculating device.

In order to achieve the above object, a defect detection method according to a seventh aspect of the invention is a defect detection method which is executed in a defect detection apparatus for detecting a defect based upon an image including an edge of an object as an inspection object, characterized in that a plurality of edge points are detected from an image including an edge of part or the whole of the object as the inspection object, a representative edge point representing the plurality of edge points present within a reference range having a previously set prescribed width is calculated in each shifted position of the reference range, while the reference range is sequentially shifted, residuals between a plurality of calculated representative edge points and corresponding edge points are calculated, and a position and a size of the defect are specified based upon the calculated residuals.

Further, a defect detection method according to an eighth aspect of the invention is characterized in that in the seventh aspect, all the edge points detected by the edge-point detecting device and all the corresponding representative edge points are overlapped and displayed on the same positional coordinates.

Further, a defect detection method according to a ninth aspect of the invention is characterized in that in the seventh aspect, the calculated residuals are displayed.

Further, a defect detection method according to a tenth aspect of the invention is characterized in that in the seventh aspect, weighting factors to be allocated to the edge points are calculated based upon the calculated residuals.

Further, a defect detection method according to an eleventh aspect of the invention is characterized in that in the tenth aspect, the larger (smaller) the residual is, the smaller (larger) weighting factor is calculated.

Further, a defect detection method according to a twelfth aspect of the invention is characterized in that in the tenth aspect, the representative edge point is recalculated based upon the calculated weighting factor.

In order to achieve the above object, a computer program according to a thirteenth aspect of the invention is a computer program which is executed in a defect detection apparatus for detecting a defect based upon an image including an edge of an object as an inspection object, characterized in that the defect detection apparatus is configured to function as an: edge-point detecting device for detecting a plurality of edge points from an image including an edge of part or the whole of the object as the inspection object; a representative-edge-point calculating device for calculating a representative edge point representing the plurality of edge points present within a reference range having a previously set prescribed width in each shifted position of the reference range, while sequentially shifting the reference range; a residual calculating device for calculating residuals between a plurality of calculated representative edge points and corresponding edge points; and a defect specifying device for specifying a position and a size of the defect based upon the calculated residuals.

In the first, seventh and thirteenth aspects, a plurality of edge points are detected from an image including an edge of part or the whole of an object as an inspection object, and a representative edge point representing the plurality of edge points present within a reference range having a previously set prescribed width is calculated in each shifted position of the reference range, while the reference range is sequentially shifted. Residuals between a plurality of calculated representative edge points and corresponding edge points are calculated, and a position and a size of the defect are specified based upon the calculated residuals. Since a teaching image is not required to be prepared in advance nor is the outline required to have a specific shape such as a straight line or a circular, a defect can be detected in arbitrary shape. Further, calculating the representative edge point, while sequentially shifting the reference range, can detect the defect including its width, size, and the like, even in the case of an object having a complex shape. Moreover, varying the width of the reference range can adjust a size of a detectable defect.

In the second and eighth aspect, all the detected edge points and all the corresponding representative edge points are overlapped and displayed on the same positional coordinates. Overlapping and displaying the edge points and representative edge points on the same positional coordinates can facilitate to check in which position and what size a defect such as a burr or a crack has occurred.

In the third and ninth aspects, also displaying the calculated residuals allows clearer checking of a position and a size a defect, such as a burr or a crack, having occurred.

In the fourth and tenth aspect, weighting factors to be allocated to the edge points are calculated based upon the calculated residuals. Thereby, for example, a small weighting factor is allocated to an edge point likely to be a defect, and a large weighting factor is allocated to an edge point unlikely to be a defect, and a representative edge point is calculated using the allocated weighting factor, so that a representative edge point with an influence of the defect portion suppressed can be calculated to improve the ability to detect a defect.

In the fifth and eleventh aspects, the larger (smaller) the residual is, the smaller (larger) weighting factor is calculated. Thereby, a small weighting factor is allocated to an edge point likely to be a defect, and a large weighting factor is allocated to an edge point unlikely to be a defect, and a representative edge point is calculated using the allocated weighting factor, so that a representative edge point with an influence of the defect portion suppressed can be calculated to improve the ability to detect a defect.

In the sixth and twelfth aspects, the representative edge point is recalculated based upon the calculated weighting factor. Recalculating the representative edge point can prevent calculation of a representative-edge-point sequence which is curved due to the influence of the defect portion, thereby improving the ability to detect a defect.

It is to be noted that in later-described embodiments, the edge-point detecting device corresponds to processing performed by a main control section 21 in step S202, the representative-edge-point calculating device corresponds to processing performed by the main control section 21 in steps S206 to S209, the residual calculating device corresponds to processing performed by the main control section 21 in step 210, and the defect specifying device corresponds to processing performed by the main control section 21 in steps S211, S904 and S1207.

Further, the first display device and the second display device correspond to processing performed by the main control section 21 in steps S212, S905 and S1208, and the weighting factor calculating device corresponds to processing performed by the main control section 21 in steps S901 and S1202.

According to the present invention, since a teaching image is not required to be prepared in advance nor is the outline required to have a specific shape such as a straight line or a circular, a defect can be detected in arbitrary shape. Further, calculating the representative edge point, while sequentially shifting the reference range, can detect the defect including its width, size, and the like, even in the case of an object having a complex shape. Moreover, varying the width of the reference range can adjust a size of a detectable defect.

DETAILED DESCRIPTION OF THE PREFERRED EMBODIMENTS

A defect detection apparatus according to an embodiment of the present invention is described below with reference to the drawings. It is to be noted that elements having the same or similar configurations or functions through the drawings referenced in description of each embodiment are provided with the same or similar numerals, and the detailed descriptions thereof are not given.

First Embodiment

Figure 1:
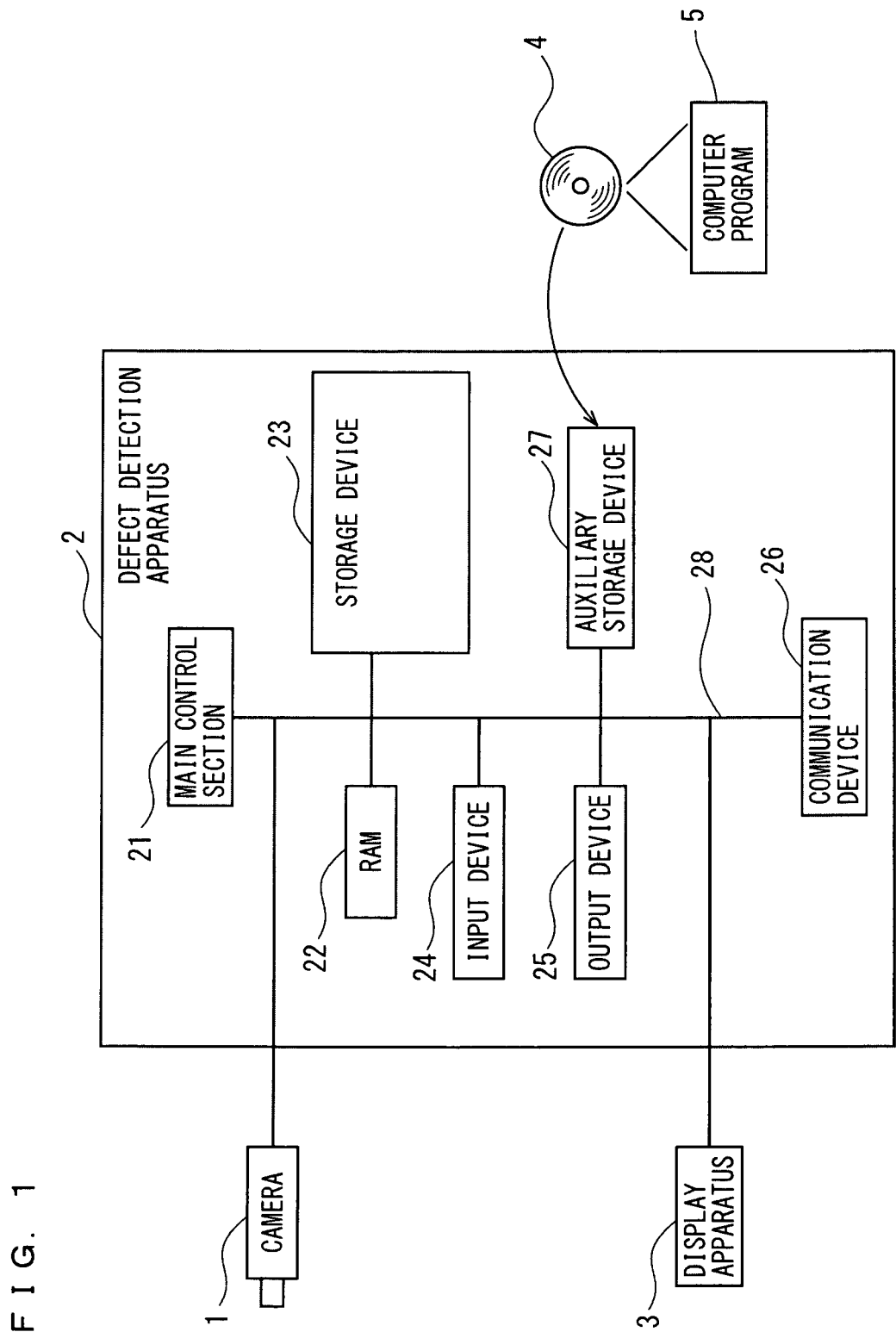
FIG. 1 is a block diagram schematically showing a configuration of a defect detection apparatus according to a first embodiment of the present invention.

FIG. 1 is a block diagram schematically showing a configuration of a defect detection apparatus according to a first embodiment of the present invention. As shown in FIG. 1, a defect detection apparatus 2 according to the present first embodiment is connected with a camera 1 as an image pickup device for picking up a multi-valued image, and a display apparatus 3 which displays a picked-up multi-valued image or a generated image.

The defect detection apparatus 2 is configured of at least a CPU (Central Processing Unit), the main control section 21 made up of an LSI or the like, an RAM 22, a storage device 23, an input device 24, an output device 25, a communication device 26, an auxiliary storage device 27, and an internal bus 28 for connecting the foregoing hardware. The main control section 21 is connected to each of hardware sections of the defect detection apparatus 2 as described above through the internal bus 28, and controls the operation of each of the foregoing hardware sections while executing a variety of software functions in accordance with a computer program 5 stored in the storage device 23. The RAM 22 is configured of a non-volatile memory, such as an SRAM or an SDRAM, and develops a load module at the time of execution of the computer program 5, to store temporary data generated at the time of execution of the computer program 5, and the like.

The storage device 23 is made up of a fixed-type storage apparatus (a hard disk, a flash memory) built therein, an ROM, and the like. The computer program 5 stored in the storage device 23 is downloaded by the auxiliary storage device 27 from a portable recording medium 4 such as a DVD, a CD-ROM or a flash memory where information such as a program, data and the like are recorded, and at the time of execution of the computer program 5, it is developed from the storage device 23 to the RAM 22 for the execution. Naturally, the computer program 5 may be a computer program downloaded from an external computer through the communication device 26.

The communication device 26 is connected to the internal bus 28, and is capable of transmitting and receiving data to and from the external computer or the like by being connected to an external network, such as the Internet, a LAN, a WAN or the like. That is, the foregoing storage device 23 is not limited to a configuration built in the defect detection apparatus 2, but may be an external record medium such as a hard disk, installed in an external server computer connected through the communication device 26.

The input device 24 is a broad concept including an overall apparatus that acquires input information of a touch panel integrated with a liquid crystal panel besides data input medium such as a keyboard and a mouse. The output device 25 means a printing apparatus such as a laser printer or a dot printer, or the like.

The camera 1 is a CCD camera having a CCD image pickup element, or the like. The display apparatus 3 is a display apparatus having a CRT, a liquid crystal panel, or the like. The camera 1, the display apparatus 3, and the like may be integrated with the defect detection apparatus 2, or may be separated therefrom.

Figure 2:
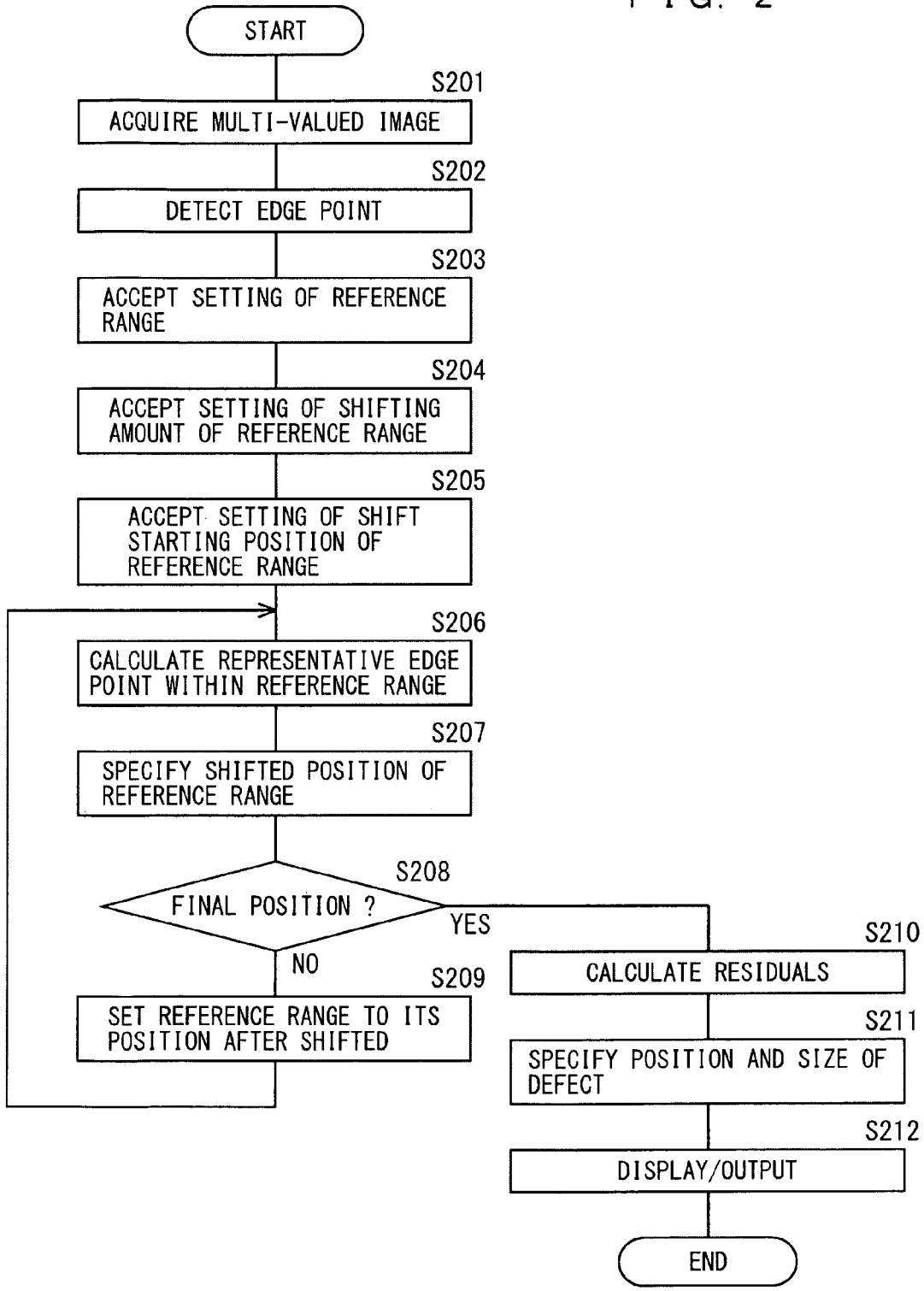
FIG. 2 is a flowchart showing a processing procedure of a main control section of the defect detection apparatus according to the first embodiment of the present invention.

A flow of processing of the defect detection apparatus 2 having the foregoing configuration is described. In the defect detection apparatus 2 according to the present first embodiment, an approximate curve is obtained based upon an edge-point sequence showing an edge of an object as an inspection object. An approximate curve is not obtained directly with respect to an edge-point sequence, but a plurality of local representative edge points are calculated and a representative-edge-point sequence is interpolated to obtain an apparent approximate curve, thereby allowing the apparatus to deal with a variety of curves. FIG. 2 is a flowchart showing a processing procedure of the main control section 21 of the defect detection apparatus 2 according to the first embodiment of the present invention.

As shown in FIG. 2, the main control section 21 of the defect detection apparatus 2 according to the present first embodiment acquires a multi-valued image including an edge of part or the whole of an object as an inspection object, the image of which was picked up by the camera 1 (step S201), and detects a plurality of edge points from the acquired multi-valued image (step S202).

Figure 3:
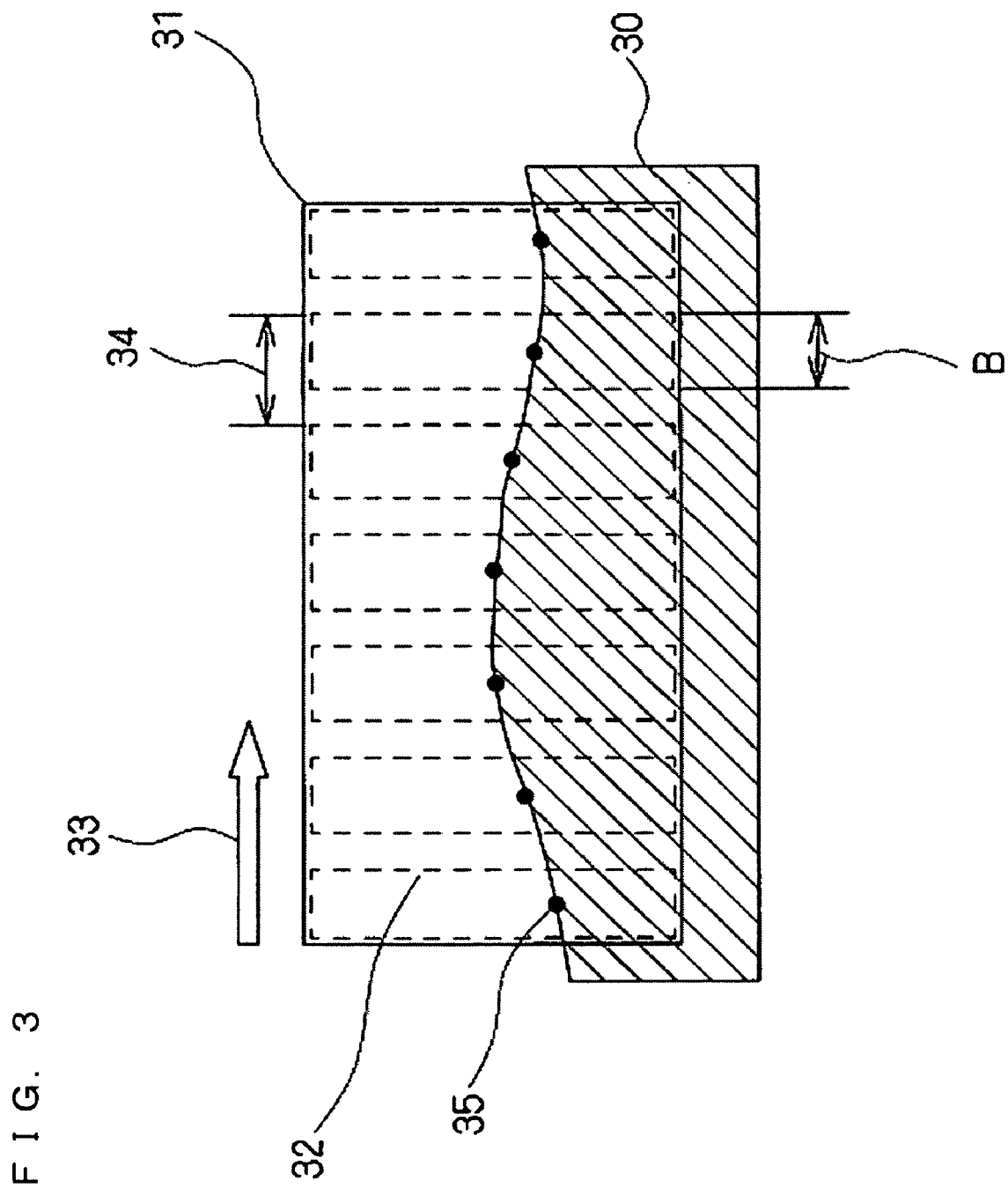
FIG. 3 is a schematic view explaining an edge-point detection method in a case of an object region being a rectangular region.

An edge-point detection method is not particularly limited so long as being a known detection method. For example, a segment of an arbitrary size is shifted within an object region which is a region as an object for detecting edge points, and one edge point is detected in each position to which the segment is shifted. FIG. 3 is a schematic view explaining an edge-point detection method in a case of the object region being a rectangular region.

A segment 32, being a rectangular region having a prescribed width B, is set within an object region 31 including part or the whole of an edge of an object 30 as an inspection object. The segment 32 is sequentially shifted with a span 34 in the direction of an arrow 33, and coordinate values of medians of the edge of the object 30 are detected as edge points 35, 35, . . . at the respective shifted positions.

The larger the width B of the segment 32 is made, the more stably the edge points can be detected without affected by a noise. Meanwhile, minute fluctuations are ignored. Further, the larger the width B of the segment 32 is made, the more the time for detecting edge points can be reduced, but the number of detected edge points decreases and the accuracy of the defect detection deteriorates.

Figure 4:
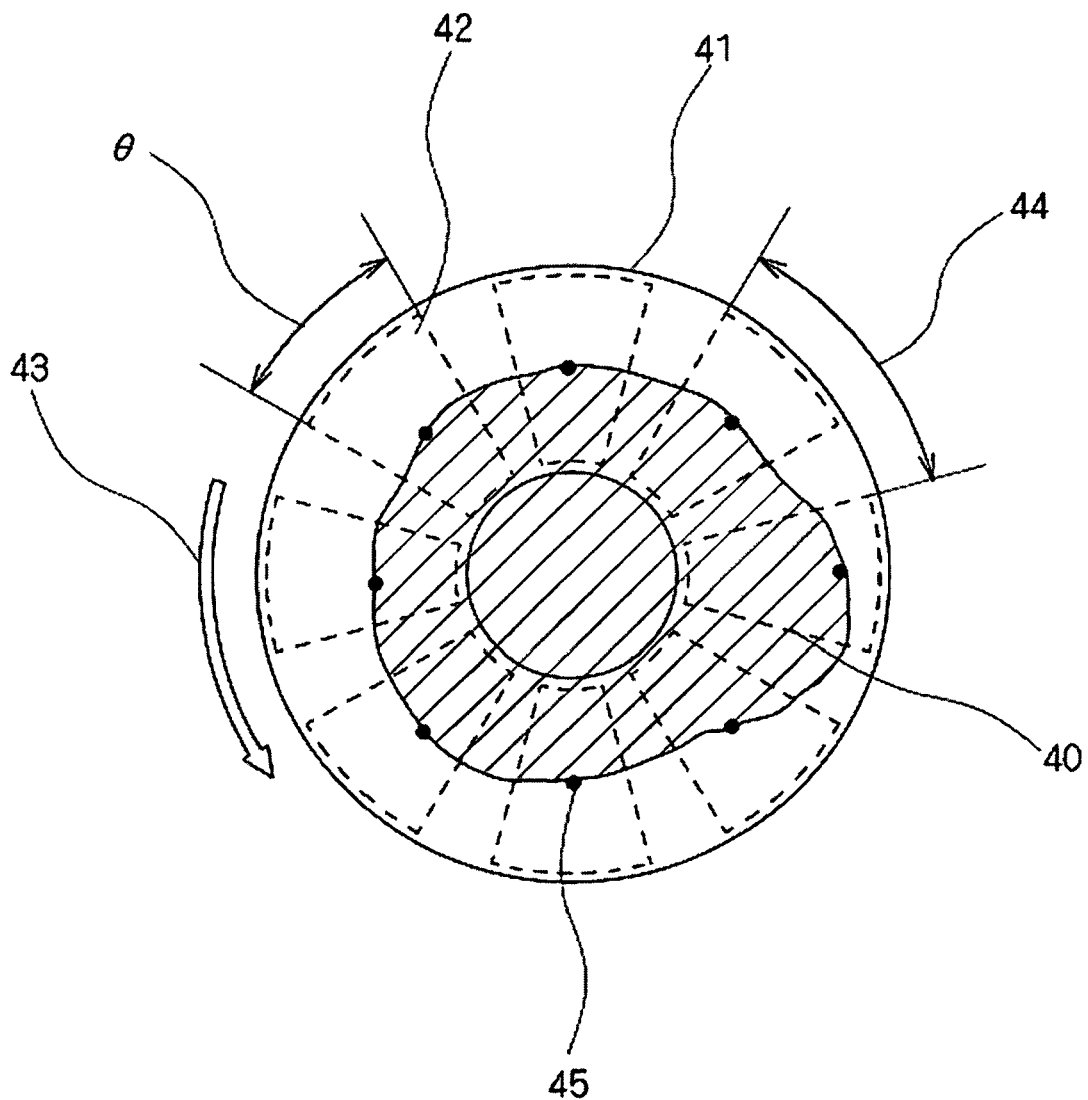
FIG. 4 is a schematic view explaining an edge-point detection method in a case of an object region being a circular region.

Further, FIG. 4 is a schematic view explaining an edge-point detection method in a case of the object region being a circular region. In the case of the object region being a circular region, polar-coordinate conversion is executed, and thereafter, edge points are detected in the following procedure.

A segment 42 as a region having a prescribed central angle θ is set within an object region 41 including part or the whole of an edge of an object 40 as an inspection object. The segment 42 is rotationally shifted with a span central angle 44 in the direction of an arrow 43, and polar coordinate values of medians of the edge of the object 40 are detected as edge points 45, 45, at the respective rotated positions.

The larger the central angle θ of the segment 42 is made, the more stably the edge points can be detected without affected by a noise. Meanwhile, minute fluctuations are ignored. Further, the larger the central angle θ of the segment 42 is made, the more the time for detecting edge points can be reduced, but the number of detected edge points decreases and the accuracy of the defect detection deteriorates.

Figure 5:
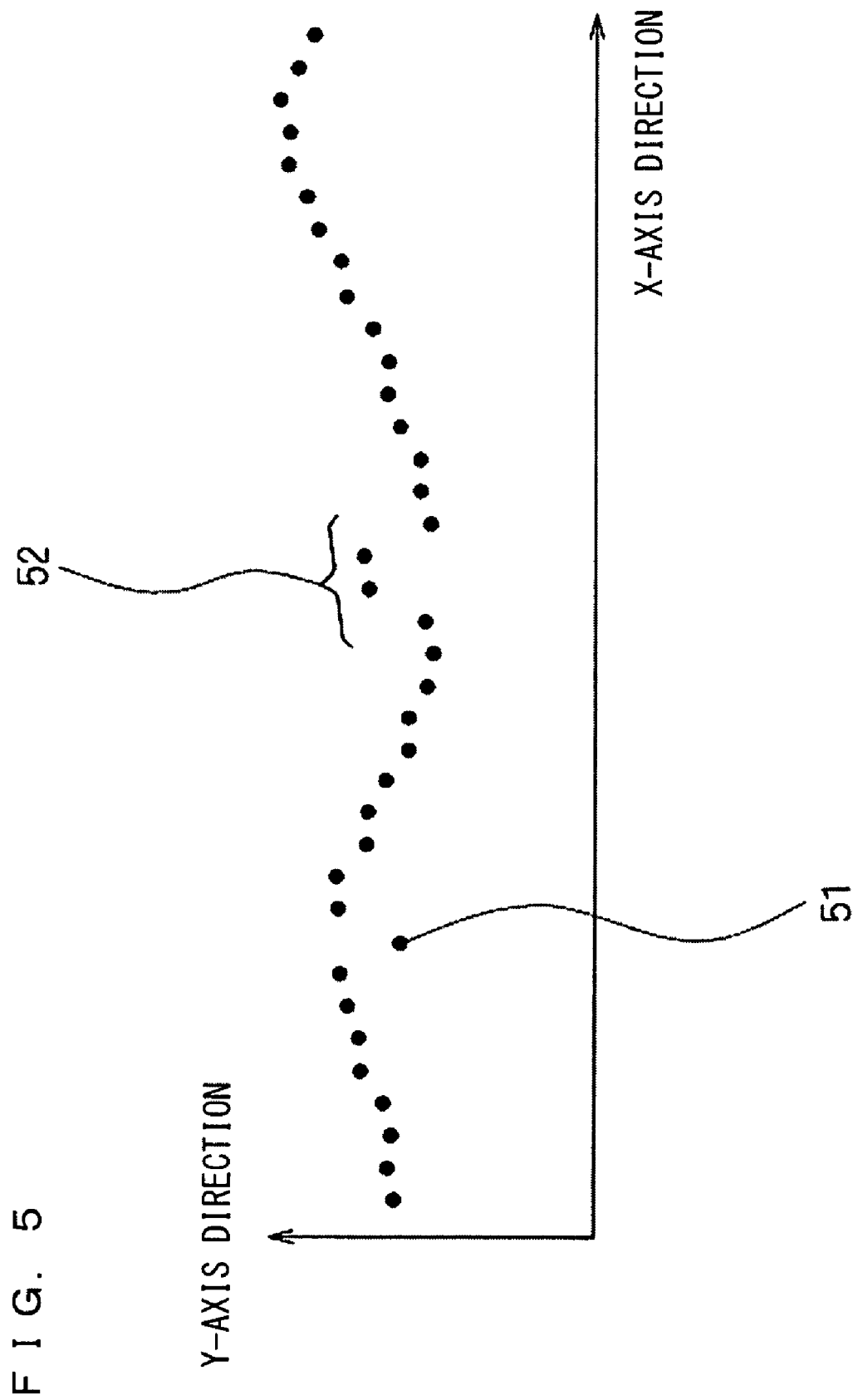
FIG. 5 is an explanatory view of edge points detected in the case of the object region being the rectangular region.

The following processing are described, taking the case of the object region being a rectangular region as an example in the present first embodiment, but it goes without saying that similar processing are executable when the polar coordinate conversion is executed even in the case of the object region being a circular region. FIG. 5 is an explanatory view of edge points detected in the case of the object region being a rectangular region.

FIG. 5 exemplifies an edge-point sequence in a case where a shifting direction of the segment 32 is an X-axis direction and a direction orthogonal to the X-axis direction is a Y-axis direction. In the example of FIG. 5, it is possible to assume that an edge point 51 and an edge-point sequence 52 each include a defect.

Returning to FIG. 2, the main control section 21 of the defect detection apparatus 2 accepts setting of a reference range having a previously set width (step S203), and also accepts setting of a shifting amount of the reference range (step S204). The main control section 21 then accepts setting of a shift starting position (initial position) of the reference range (step S205).

The reference range settable in step S203 has the minimum width among widths of settable regions including at least two adjacent edge points based upon the span 34 set by the foregoing edge detection method. A range wider than this range may be set depending upon the number of edge points wished to be included within the reference range desired by the user.

Further, the shifting amount of the reference range which is settable in step S204 is the span 34 set by the foregoing edge detection method, namely, the shifting amount is the minimum width between the edge points. A shifting amount larger than this amount can be set as an integral multiple of the minimum shifting amount between the edge points.

Moreover, instead of being made settable by the user at an arbitrary position, the initial position of the reference range in step S205 may be automatically set at a position with the leftmost edge point taken as the center among the edge points detected in the foregoing edge detection. In this case, when a later described secondary approximate curve is to be used, at least three edge points are required. However, since edge points in number required in calculation by the least squares method are not present in the shift starting position, as exceptional processing, an edge point located at the center of the reference range may be taken as a representative edge point.

Therefore, the minimum units of the width of the reference range in step S203 and the minimum unit of the shifting amount of the reference range in step S204 are set based upon the shift span of the segment used in the case of executing the foregoing edge-point detection method.

Figure 6:
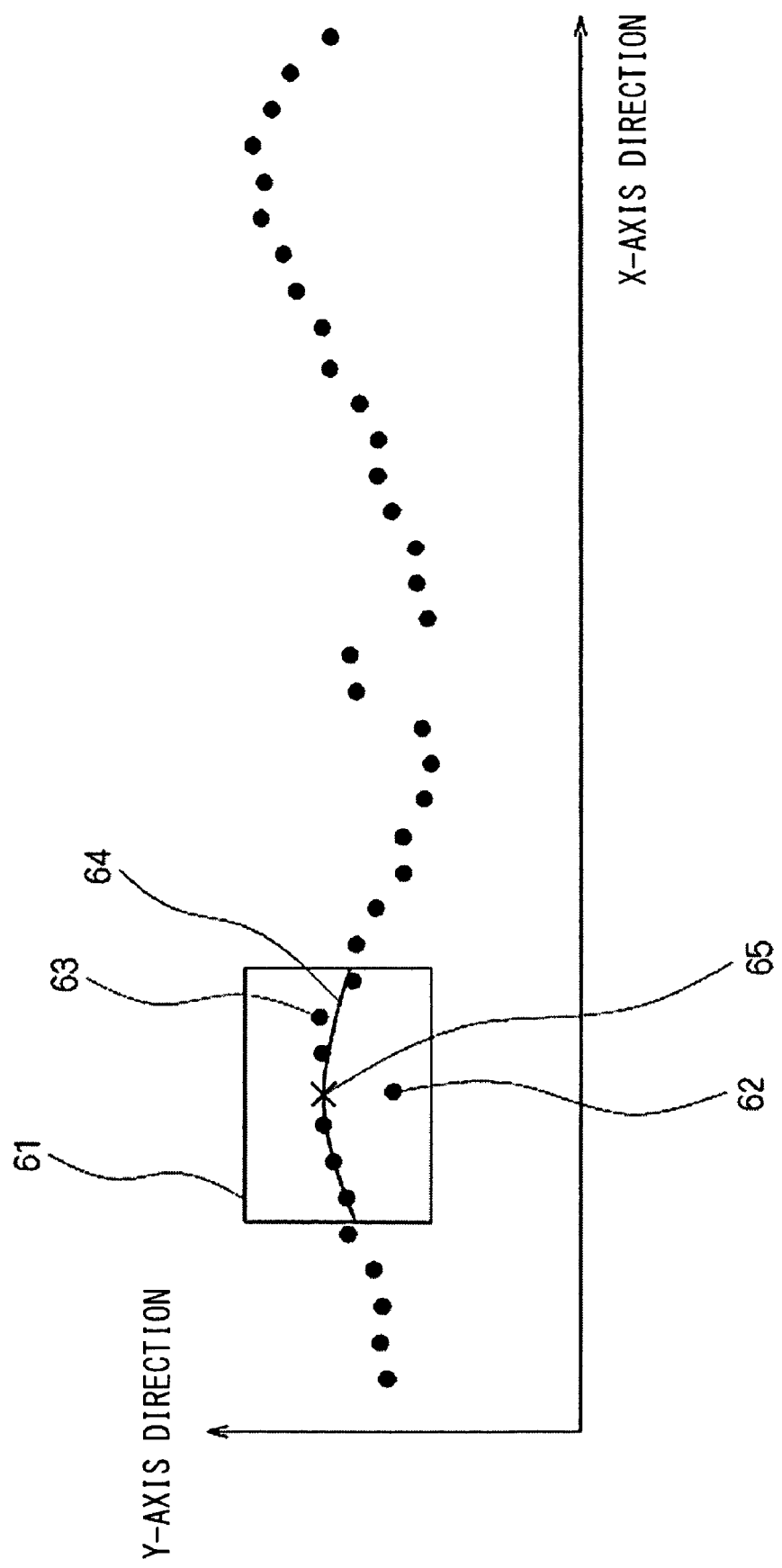
FIG. 6 is a schematic view explaining a method for calculating a representative edge point.

The main control section 21 calculates a representative edge point representing a plurality of edge points included in the reference range at the shift starting position (step S206). FIG. 6 is a schematic view for explaining a method for calculating a representative edge point.

In FIG. 6, an Nth-order regression curve 64 of the edge-point sequence is obtained based upon a total of seven edge points, which are an attention edge point 62 present in the reference range 61 and three edge points 63, 63, . . . each located to the left and right of the attention edge point 62 taken as the center. The width of the reference range 61 is settable in line with a size of a defect as a detection object. The representative edge point 65 is calculated as a Y-coordinate value of the Nth-order regression curve 64 corresponding to an X-coordinate value of the attention edge point 62.

It is to be noted that the order of the Nth-order regression curve is not particularly limited, and it may be variable or fixed. Further, when "N" is supposed as "2", obtaining the Nth-order regression curve 64 requires inclusion of at least three edge points within the reference range 61. In addition, with calculation cost and performance taken into consideration, the order of the regression curve may be in the order of "2", but the calculation can be made with the order being "1".

As a specific calculation method in the case of the order of the regression curve being "2", when the edge-point sequence obtained by the foregoing edge-point detection method is (xi, yi) and the regression curve to be obtained is $y=ax2+bx+c$, parameters a, b and c of an approximate curve by the least square method can be obtained by solving a matrix equation of equation (1).

[Equation 1]

$$\begin{pmatrix} \sum_{i=1}^{n} x_i^4 & \sum_{i=1}^{n} x_i^3 & \sum_{i=1}^{n} x_i^2 \\ \sum_{i=1}^{n} x_i^3 & \sum_{i=1}^{n} x_i^2 & \sum_{i=1}^{n} x_i \\ \sum_{i=1}^{n} x_i^2 & \sum_{i=1}^{n} x_i & \sum_{i=1}^{n} 1 \end{pmatrix} \begin{pmatrix} a \\ b \\ c \end{pmatrix} = \begin{pmatrix} \sum_{i=1}^{n} x_i^2 y_i \\ \sum_{i=1}^{n} x_i y_i \\ \sum_{i=1}^{n} y_i \end{pmatrix} \quad (1)$$

In a case where edge points in number required for calculating the regression curve are not present in the reference range 61, for example in the case of calculating a representative edge point at the end of an acquired image, the edge point itself is calculated as the representative edge point. This enables one representative edge point to be obtained for certain with each interval of the shifting amount of the reference range.

In accordance with the width of the reference range 61, the size of the defect to be detected can be controlled. Specifically, in the case of a large width of the reference range 61, a large defect can be the detection object, whereas in the case of a small width of the reference range 61, a small defect can be the detection object, but a large defect becomes an object of an approximate curve (hereinafter referred to as an apparent approximate curve) obtained by interpolating the obtained representative-edge-point sequence with a curve or a straight line, so as not to be detected as a defect. Hence it is possible to detect a desired defect by user's setting a width corresponding to a size of a defect wished to be detected by the user.

Returning to FIG. 2, after shifting the reference range 61 by just a set shifting amount, the main control section 21 of the defect detection apparatus 2 specifies the shifted position (step S207), and determines whether or not the reference range 61 has been shifted to a final position, e.g. whether or not an edge point not included in the shifting reference range 61 is present (step S208).

When determining that the whole of the object region for detecting the defect has not been included (step S208: NO), the main control section 21 sets the position of the reference range 61 to the position after shifted (step S209), returns the processing to step S206, and repeats the foregoing processing. When determining that the whole of the object region for detecting the defect is included (step S208: YES), the main control section 21 calculates, with respect respective edge points, residuals between coordinate values (Y-coordinate values) of a plurality of calculated representative edge points and coordinate values (Y-coordinate values) of corresponding edge points (step S210). The main control section 21 specifies the position and the size of the defect based upon the calculated residuals (step S211).

It is to be noted that, although a residual calculation method is not particularly limited, for example in a case where the representative-edge-point sequence is calculated with the same intervals as those of the edge-point sequence, a residual may be calculated by calculating a difference in Y-coordinate value between an edge point and a representative edge point which have a consistent X-coordinate value. On the other hand, in a case where the intervals of the representative-edge-point sequence are different from those of the edge-point sequence, a residual may be calculated by calculating a difference in Y-coordinate value between an edge point and an interpolated value interpolating between representative edge points. As the interpolation method, simple linear interpolation may be performed, or curve interpolation such as Lagrangian interpolation or spline interpolation may be performed.

The main control section 21 displays and outputs information concerning a position and a size of a specified defect (step S212). The information displayed and outputted is not particularly limited, but for example, it is preferable to overlap the detected edge points 63, 63, ... and the corresponding representative edge points 65, 65, ... on the same positional coordinate axes, for display and output onto the display apparatus 3. For this can facilitate to check in which position and what size a defect such as a burr or a crack has occurred.

Figure 7:
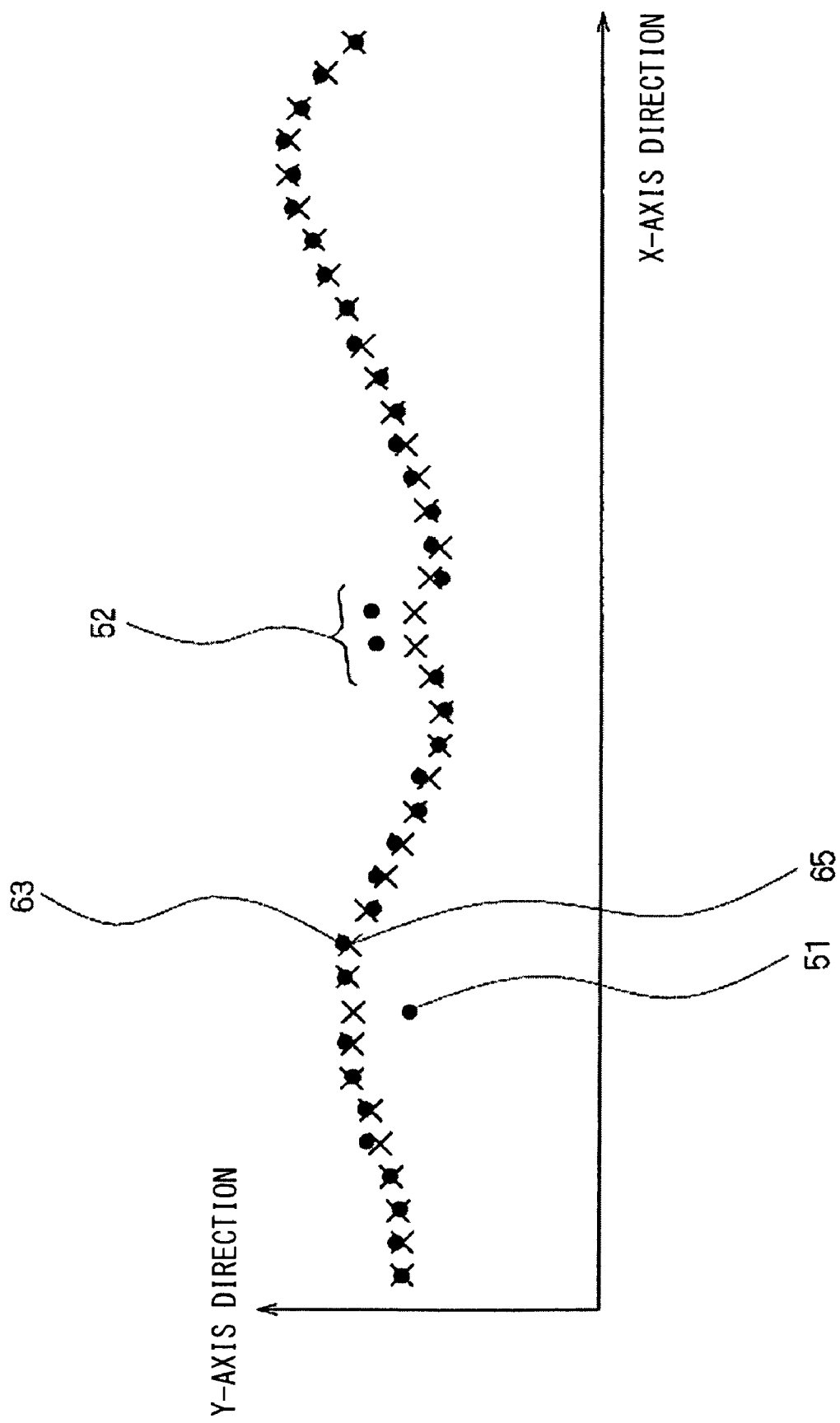
FIG. 7 is an explanatory view displaying representative edge points, calculated in a case of a reference range having been shifted with an interval of one edge point, on the same positional coordinate axes as those of corresponding edge points.

FIG. 7 is an explanatory view displaying representative edge points, calculated in the case of the reference range 61 having been shifted with an interval of one edge point, on the same positional coordinate axes as those of corresponding edge points. In FIG. 7, one corresponding representative edge point 65 is calculated with respect to each edge point 63. It is found that an approximate curve not including a defect has been obtained even with the presence of the edge point 51 and the edge-point sequence 52 which are assumed to be defects. This can facilitate to specify the positions of the edge point 51 and the edge-point sequence 52, so as to specify the sizes of the defects at the edge point 51 and the edge-point sequence 52 based upon differences from the approximate curve.

Further, the main control section 21 may overlap the residuals between the calculated representative edge points and the corresponding edge points on the same positional coordinate axes as the edge points 63, 63, ... and the representative edge points 65, 65, ..., for display and output onto the display apparatus 3. For this can facilitate to check in which position and what size a defect such as a burr or a crack has occurred.

Figure 8:
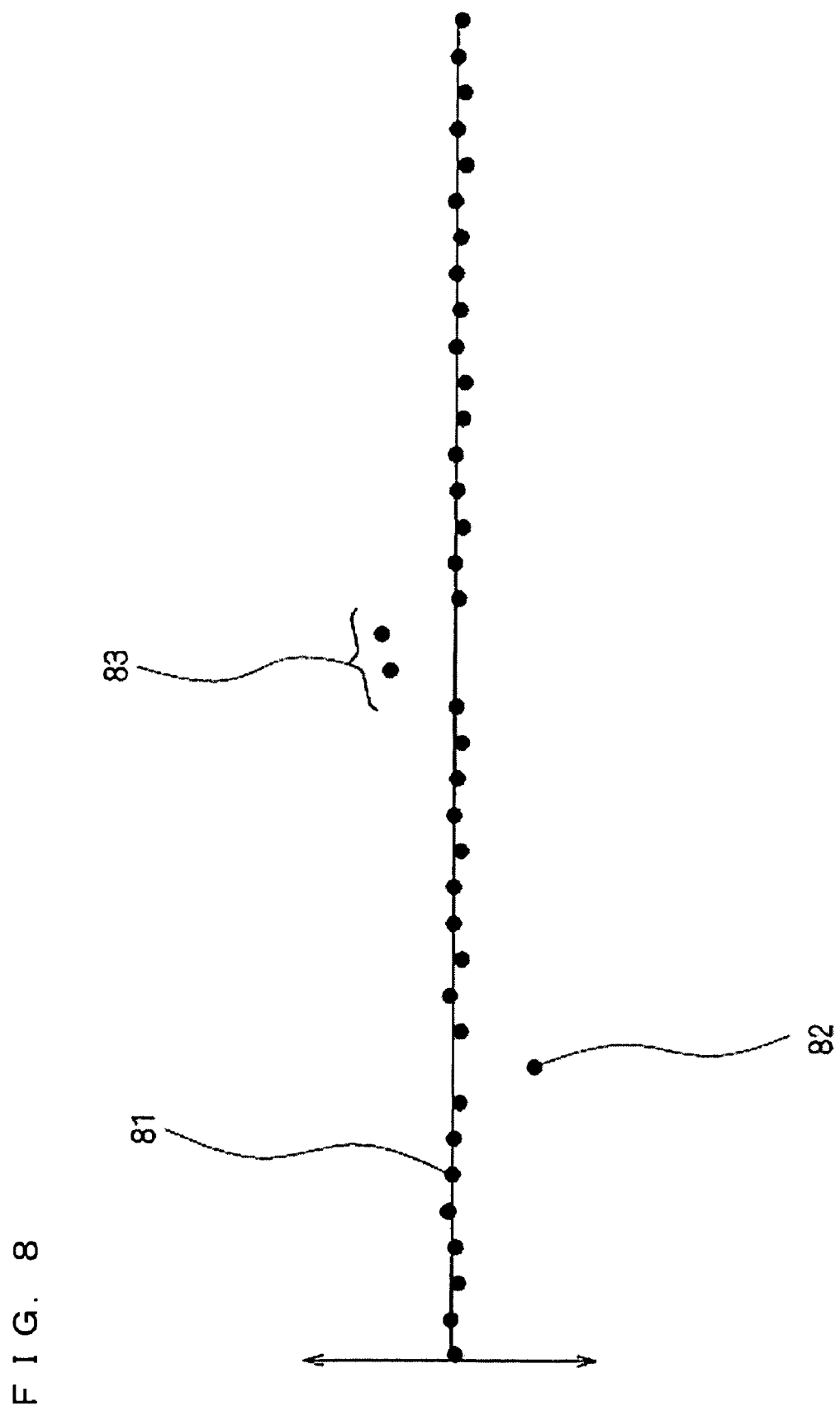
FIG. 8 is an explanatory view in a case of displaying residuals between the calculated representative edge points and the corresponding edge points on the same positional coordinate axes.

FIG. 8 is an explanatory view in a case of displaying residuals between the calculated representative edge points and the corresponding edge points on the same positional coordinate axes. In FIG. 8, each residual 81 is displayed on the same positional coordinate axis as that of the edge point, and it is found that residuals 82, 83 show protruding values in positions corresponding to the edge point 51 and the edge-point sequence 52 which are assumed to be defects. Further, with the values of the residuals 82, 83, the sizes of the defects at the edge point 51 and the edge-point sequence 52 can also be accurately grasped.

As thus described, according to the present first embodiment, since a teaching image is not required to be prepared in advance nor is the outline required to have a specific shape such as a straight line or a circular, the defect can be detected in arbitrary shape. Further, calculating the representative edge point, while sequentially shifting the reference range, can detect the defect including its width, size, and the like, even in the case of an object having a complex shape. Moreover, varying the width of the reference range can adjust a size of a detectable defect.

Second Embodiment

A configuration of a defect detection apparatus 2 according to a second embodiment of the present invention is similar to the first embodiment, and hence the same numerals are provided thereto and the detailed descriptions thereof are not given. The present second embodiment is different from the first embodiment in that weighting is performed on respective edge points based upon residuals, to calculate a representative-edge-point sequence based upon the weighting.

Figure 9:
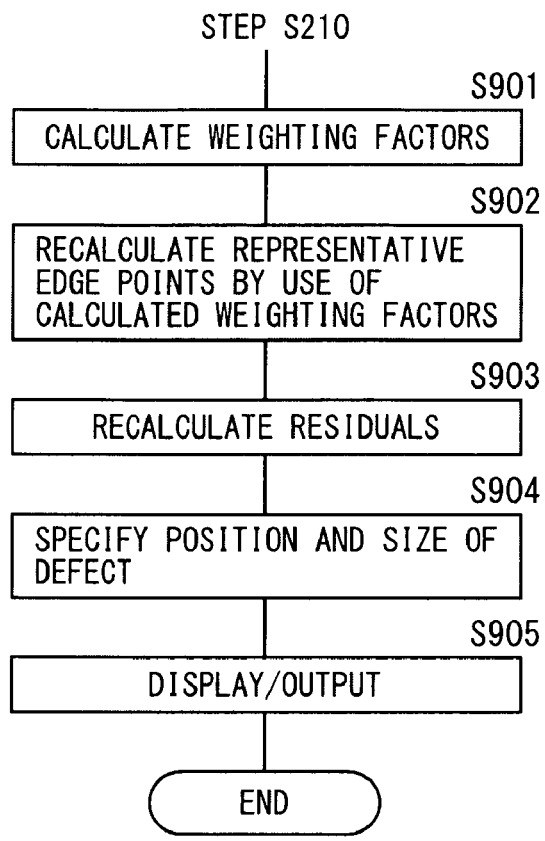
FIG. 9 is a flowchart showing a processing procedure of a main control section of the defect detection apparatus according to a second embodiment of the present invention.

FIG. 9 is a flowchart showing a processing procedure of the main control section 21 of the defect detection apparatus 2 according to the second embodiment of the present invention. In FIG. 9, since processing to step S210 are the same processing as those in FIG. 2 of the first embodiment, the detailed description thereof are not given. The main control section 21 of the defect detection apparatus 2 according to the second embodiment of the present invention calculates, with respect to respective edge points, residuals between a plurality of calculated representative edge points and corresponding edge points (step S210).

The main control section 21 calculates weighting factors to be allocated to respective edge points based upon the calculated residuals (step S901). It is to be noted that, in order to suppress the influence exerted by an edge point involved in a detected defect as much as possible, the weighting factor is set by use of an apparent approximate curve (representative-edge-point sequence), generated using the weighting factors, such that the weighting is small in the case of the detected residual being large and the weighting is large in the case of the detected residual being small. In the present second embodiment, a weighting factor Wi ("i" is a point sequence number for identification of an edge point) takes a value of $0 \leq W_i \leq 1$. An edge point closer to the representative-edge-point sequence takes a value closer to 1, and an edge point further from the representative-edge-point sequence takes a value closer to 0.

Specifically, a standard deviation a is calculated with respect to every calculated residual di ('i' is a point sequence number for identifying an edge point). The weighting factor Wi to be allocated to each edge point is calculated in accordance with equation (2). In equation (2), "C" is a constant for adjusting a degree of change in weighting factor Wi.

[Equation 2]

$$W_i = \begin{cases} \left(1 - \left(\frac{d_i}{C \times \sigma}\right)^2\right)^2 & |d_i| < C \times \sigma \\ 0 & |d_i| \geq C \times \sigma \end{cases} \quad (2)$$

Figure 10:
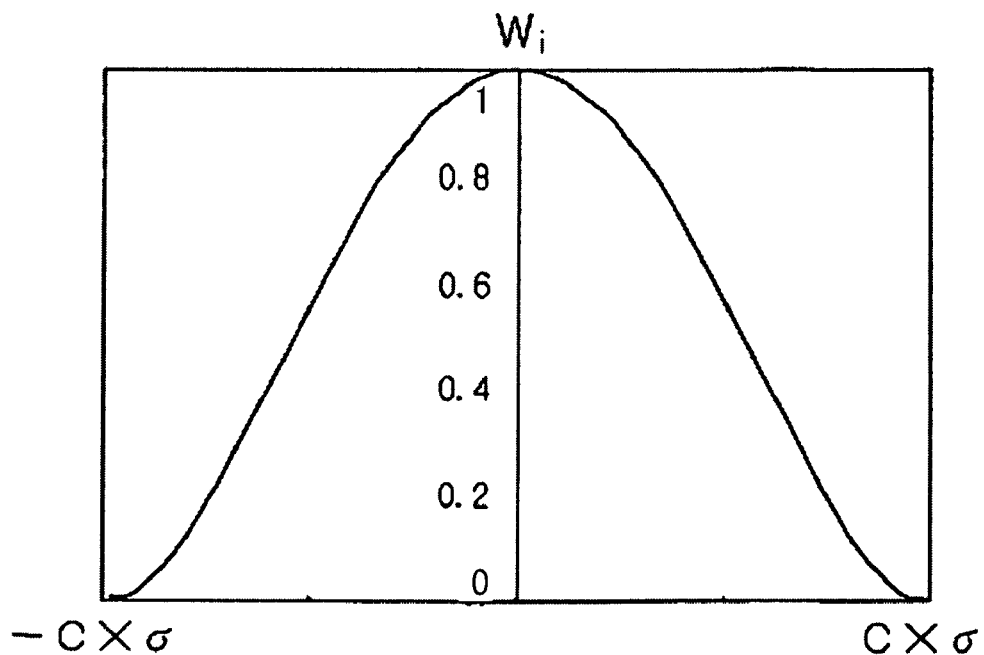
FIG. 10 is an explanatory view of a distribution degree of weighting factors.

FIG. 10 is an explanatory view of a distribution degree of the weighting factor Wi. As shown in FIG. 10, in a case of an edge point with its residual di being not smaller than a constant value $C \times \sigma$, the weighting factor Wi is set to 0. In a case of an edge point with its residual di being not larger than that, the weighting factor Wi is allocated within the range of $0 \leq W_i \leq 1$. The weighting factor Wi is allocated so as to be made closer to 0 as getting further from the representative edge point, with the weighting factor Wi set to 1 in the case of an edge point being consistent with a representative edge point, namely the residual di being 0.

It should be noted that the allocation method is not limited to the method for calculating the degree of change in weighting factor Wi with the standard deviation σ of the residual di taken as a reference. Using another statistic, such as a median of the residual di, the weighting factor Wi may be allocated so as to be made closer to 0 as getting further from the median with the weighting factor Wi at the median set to 1.

Returning to FIG. 9, the main control section 21 recalculates the representative edge point by use of the weighting factor Wi allocated to each edge point with respect to the representative-edge-point sequence obtained by the normal least square method described in the first embodiment described above (step S902).

As a specific calculation method in a case of the order of "N" being two, when the edge-point sequence obtained by the foregoing edge-point detection method is (xi, yi), the weighting factor allocated to each edge point is Wi, and the regression curve to be obtained is: y=a x2+bx+c, it is possible to obtain parameters a, b and c of the approximate curve by the least square method by solving a sequence equation of equation (3).

[Equation 3]

$$\begin{pmatrix} \sum_{i=1}^{n} w_i x_i^4 & \sum_{i=1}^{n} w_i x_i^3 & \sum_{i=1}^{n} w_i x_i^2 \\ \sum_{i=1}^{n} w_i x_i^3 & \sum_{i=1}^{n} w_i x_i^2 & \sum_{i=1}^{n} w_i x_i \\ \sum_{i=1}^{n} w_i x_i^2 & \sum_{i=1}^{n} w_i x_i & \sum_{i=1}^{n} w_i \end{pmatrix} \begin{pmatrix} a \\ b \\ c \end{pmatrix} = \begin{pmatrix} \sum_{i=1}^{n} w_i x_i^2 y_i \\ \sum_{i=1}^{n} w_i x_i y_i \\ \sum_{i=1}^{n} w_i y_i \end{pmatrix} \quad (3)$$

The main control section 21 recalculates residuals between the obtained representative edge points and the edge points (step S903), to specify a position and a size of a defect based upon the calculated residuals (step S904).

The defect determination method is not particularly Limited, but for example, it may be determined whether or not a residual not smaller than a prescribed threshold is present and then determined that the defect is present in a position where the residual was determined to be present.

The main control section 21 displays and outputs information concerning the position and the size of the specified defect (step S905). The information displayed and outputted is not particularly limited, but for example, as with the first embodiment, it is preferable to overlap the detected edge points 63, 63, . . . and the corresponding representative edge points 65, 65, . . . on the same positional coordinate axes, for display and output onto the display apparatus 3. For this can facilitate to check in which position and what size a defect such as a burr or a crack has occurred.

Figure 11:
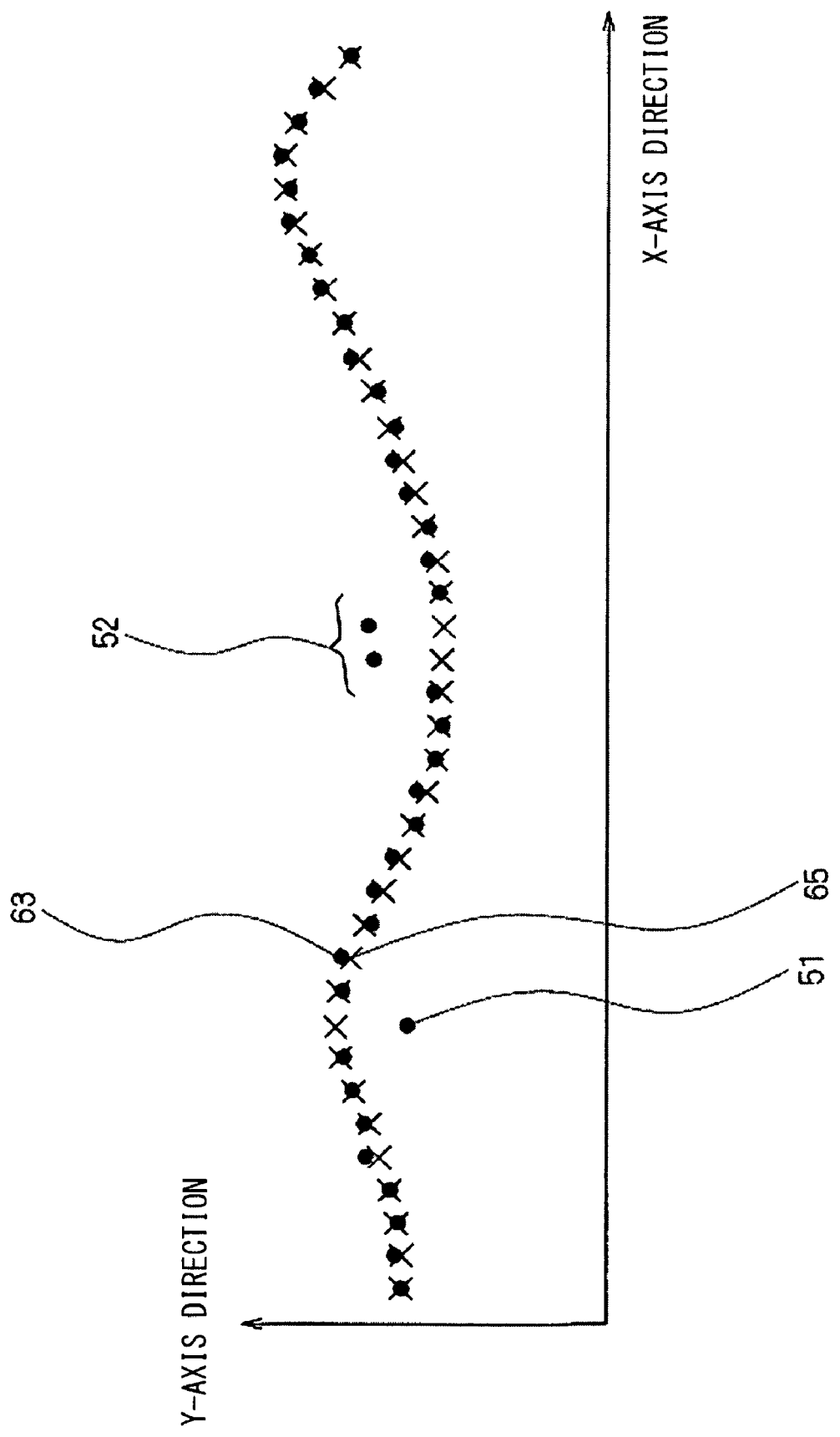
FIG. 11 is an explanatory view displaying representative edge points, calculated in the case of a reference range having been shifted with an interval of one edge point, on the same positional coordinate axes as those of corresponding edge points.

FIG. 11 is an explanatory view displaying representative edge points, calculated in the case of the reference range 61 having been shifted with an interval of one edge point, on the same positional coordinate axes as those of corresponding edge points. In FIG. 11, one corresponding representative edge point 65 is calculated for each edge point 63. It is found that, even with the presence of the edge point 51 and the edge-point sequence 52 which are assumed to be defects, the degree of curving of the apparent approximate curve (representative-edge-point sequence) due to the influence of the defect has become smaller than in the first embodiment, and a natural apparent approximate curve (representative-edge-point sequence) has been obtained. This can thus facilitate to specify the positions of the edge point 51 and the edge-point sequence 52 which are assumed to be defects, so as to more accurately specify the sizes of the defects at the edge point 51 and the edge-point sequence 52 based upon differences from the apparent approximate curve (representative-edge-point sequence).

Further, as with the first embodiment, the main control section 21 may overlap the residuals between the calculated representative edge points and the corresponding edge points on the same positional coordinate axes as the edge points 63, 63, . . . and the representative edge points 65, 65, . . . , for display and output onto the display apparatus 3. For this can facilitate to check in which position and what size a defect such as a burr or a crack has occurred.

Figure 12:
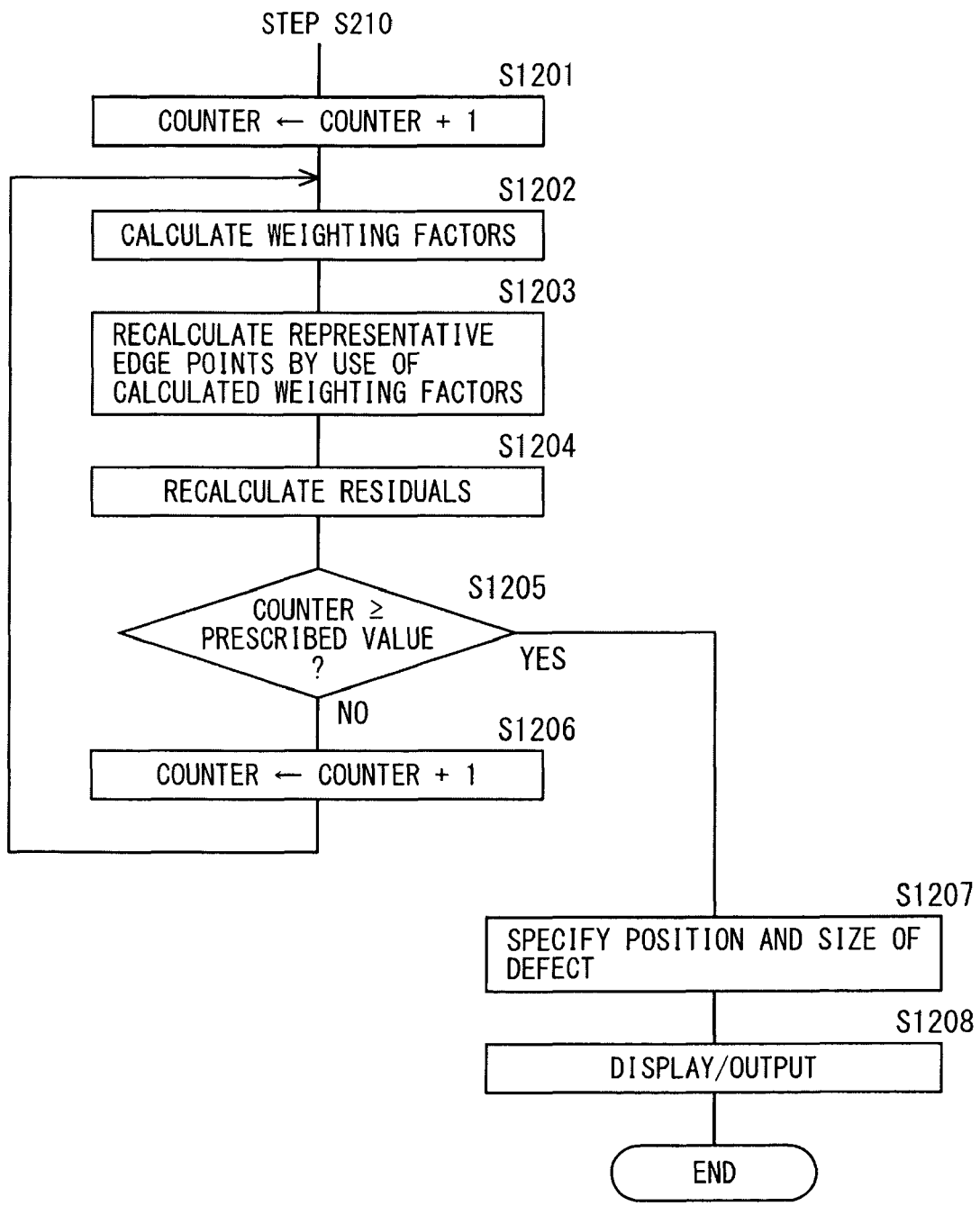
FIG. 12 is a flowchart showing a processing procedure of the main control section in a case of performing repeated calculations.

It is to be noted that repeating the foregoing representative-edge-point recalculating processing by use of the weighting factor a fixed number of times can give an apparent approximate curve (representative-edge-point sequence) free from the influence of the defection portion, so as to more accurately detect the position, the size and the like of the defection portion. FIG. 12 is a flowchart showing a processing procedure of the main control section 21 in a case of performing the repeated calculation. In FIG. 12, since processing to step S210 are the same processing as those in FIG. 2 of the first embodiment, the detailed description thereof are not given.

As shown in FIG. 12, the main control section 21 of the defect detection apparatus 2 previously initializes a counter (set to 0 in the present second embodiment) and calculates, with respect to respective edge points, residuals between a plurality of calculated representative edge points and corresponding edge points (step S210). The main control section 21 increments the counter by 1 (step S1201), and calculates weighting factors to be allocated to the respective edge points based upon the calculated residuals (step S1202), and performs calculation of representative edge points by use of the calculated weighting factors (step S1203). Since the method for calculating the weighting factor Wi ("i" is a point sequence number for identification of an edge point) is the same as the foregoing method, the detailed description thereof is not given.

The main control section 21 recalculates the obtained residuals between the representative edge points and the edge points (step S1204), to determine whether or not the counter is not smaller than a prescribed value (step S1205).

When determining that the counter is smaller than the prescribed value (step S1205: NO), the main control section 21 increments the counter by 1 (step S1206), returns the processing to step S1202, and repeats the foregoing processing. When determining that the counter is not smaller than the prescribed value (step S1205: YES), the main control section 21 specifies the position and the size of the defect based upon the calculated residuals (step S1207).

The main control section 21 displays and outputs information concerning a position and a size of a specified detect (step S1208). The information displayed and outputted is not particularly limited, but for example, as with the first embodiment, it is preferable to overlap the detected edge points and the corresponding representative edge points on the same positional coordinate axes, for display and output onto the display apparatus 3. For this can facilitate to check in which position and what size a defect such as a burr or a crack has occurred.

As thus described, according to the present second embodiment, a series of processing of calculating residuals, calculating weighting factors, and recalculating representative edge points is repeatedly executed a prescribed number of times, so that an apparent approximate curve (representative-edge-point sequence) is hardly curved due to the influence of a defect and a natural apparent approximate curve (representative-edge-point sequence) enveloping edge points other than a defect to be detected can be obtained. This can thus facilitate to specify the position of the defect, so as to more accurately specify the size of the defect based upon differences from the apparent approximate curve (representative-edge-point sequence).

Naturally, as with the first embodiment, the main control section 21 may overlap the residuals between the calculated representative edge points and the corresponding edge points on the same positional coordinate axes as those of the representative edge points and the edge points, for display and output onto the display apparatus 3. For this can facilitate to check in which position and what size a defect such as a burr or a crack has occurred.

It is to be noted that the defect determination method used in the present first and second embodiments is not limited to the method disclosed in the present first embodiment. For example, in a case where residuals not smaller than a prescribed threshold are continuously present, an edge-point sequence served as a basis of calculation of such residuals may be determined as one continuum, and a characteristic amount such as a width (the number of continuous points), an area (a total number of residuals of edge points exceeding a threshold), and a center of gravity position with respect to each continuum may be calculated and then compared with a reference characteristic amount, to determine whether or not a defect is present.

Further, as a statistic characteristic amount of the residual, a maximum value, a minimum value, an average value, a standard deviation, the number of edge points exceeding a threshold, a total area exceeding a threshold (a total of residuals of edge points exceeding a threshold) of the residual, or the like may be calculated, and then compared with a reference characteristic, to determine whether or not a defect is present.

Figure 13:
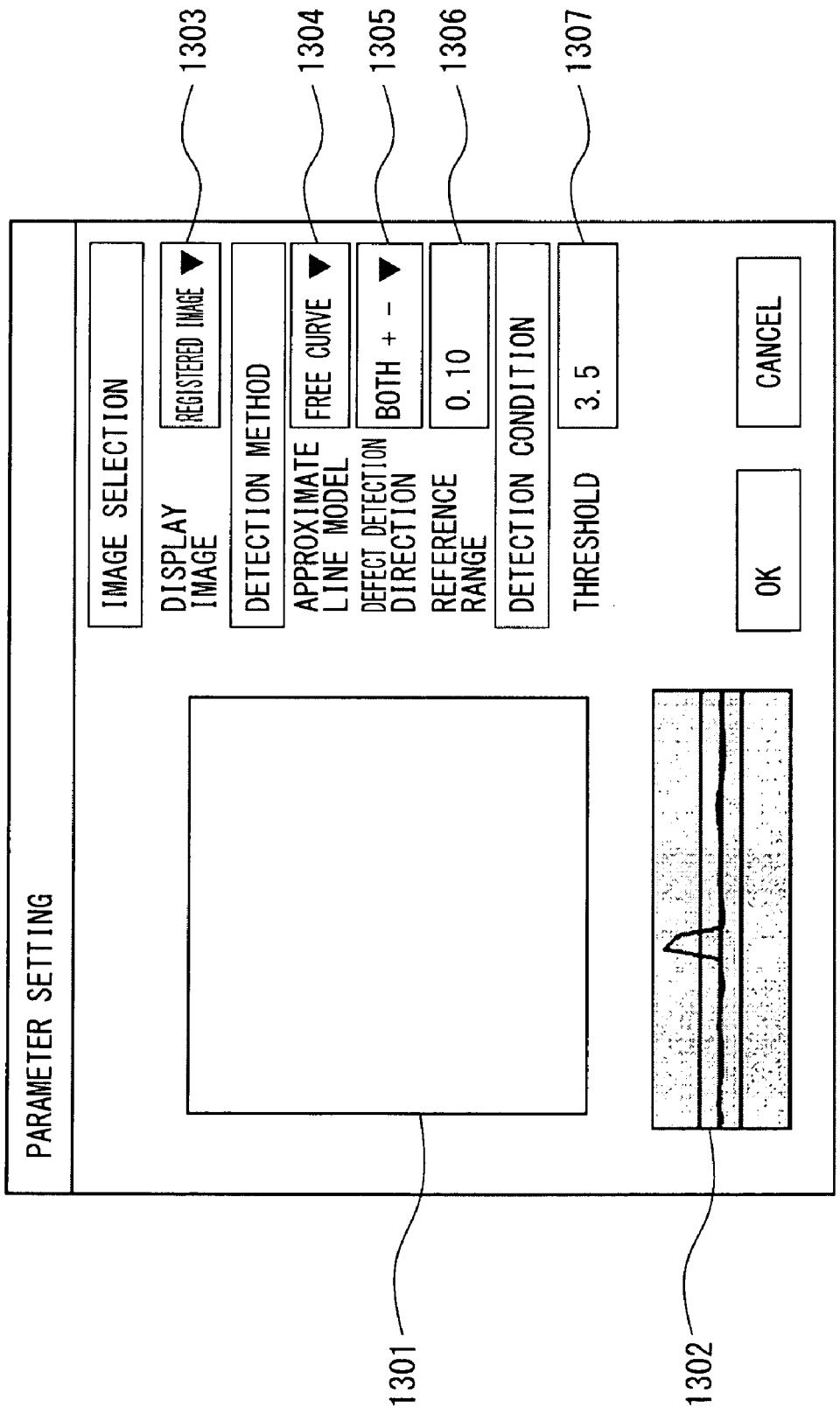
FIG. 13 is an explanatory view of a user interface displayed on a display apparatus.

In addition, it is preferred that an appropriate value be inputted by the user into the reference range 61 in the present first and second embodiments. This is aimed at adjusting whether or not detection can be made in accordance with a size of a defect as a detection object. FIG. 13 is an explanatory view of a user interface displayed on the display apparatus 3. It should be noted that the size of the defect as the detect object in the present invention means the size of the reference range in its width direction.

As shown in FIG. 13, in an image display region 1301, an acquired multi-valued image is displayed, or an edge-point sequence and an apparent approximate curve (representative-edge-point sequence) are overlapped on the acquired multi-valued image and then displayed. In the residual display region 1302, residuals between the edge points and the apparent approximate curve (representative-edge-point sequence) are displayed as a waveform. Since the X-coordinate is consistent with the image display region 1301, it is possible to visually check where the defect is present.

Further, in a display image selection region 1303, an image used for checking the state of processing is selected. For example, "Registered image" is selected in a case of using an image previously registered into the storage device 23, and "Inputted image" is selected in a case of using an image that is downloaded at an arbitrary timing.

In an approximate line model selection region 1304, an approximate line model for use in the case of appropriating an edge-point sequence is selected. For example, a straight line, a circle, an oval, a free curve, or the like can be selected. In a defect-detection-direction specifying region 1305, a direction of a projection or a depression which is detected as a defect is selected. For example, with "+direction", only a projected section is taken as the defect detection object. With "–direction", only a depressed section is taken as the defect detection object. With "both +–", both a projected section and a depressed section are taken as the defect detection objects.

In a reference range setting region 1306, the width of the reference range is set in line with the size of the defect as the detection object. The setting is made using a percentage of the number of reference points to the number of all edge points in FIG. 13, but this is not particularly limited. In a threshold setting region 1307, there is set a threshold to be a reference for determination as to whether or not a defect is present with respect to the residuals.

The user can reference result outputs displayed in the image display region 1301 and the residual display region 1302, while changing set values in the reference range setting region 1306 and the threshold setting region 1307, so as to facilitate setting of parameter in accordance with the detected defect.

What is claimed is:

1. A defect detection apparatus, which detects a defect based upon an image including an edge of an object as an inspection object, comprising:
an edge-point detecting device for detecting a plurality of edge points from an image including an edge of part or the whole of the object as the inspection object;
a representative-edge-point calculating device for calculating a representative edge point representing the plurality of edge points present within a reference range having a previously set prescribed width in each shifted position of the reference range, while sequentially shifting the reference range;
a residual calculating device for calculating residuals between a plurality of calculated representative edge points and corresponding edge points; and
a defect specifying device for specifying a position and a size of the defect based upon the calculated residuals.

2. The defect detection apparatus according to claim 1, comprising
a first display device for overlapping and displaying, on the same positional coordinates, all the edge points detected by the edge-point detecting device and all the corresponding representative edge points.

3. The defect detection apparatus according to claim 1, comprising
a second display device for displaying the residuals calculated by the residual calculating device.

4. The defect detection apparatus according to claim 1, comprising
a weighting factor calculating device for calculating weighting factors to be allocated to the edge points based upon the residuals calculated by the residual calculating device.

5. The defect detection apparatus according to claim 4, wherein the weighting factor calculating device is configured such that the larger (smaller) the residual is, the smaller (larger) weighting factor is calculated.

6. The defect detection apparatus according to claim 4, wherein the representative-edge-point calculating device is configured to recalculate the representative edge point based upon the weighting factor calculated by the weighting factor calculating device.

7. A defect detection method, which is executed in a defect detection apparatus for detecting a defect based upon an image including an edge of an object as an inspection object, wherein
a plurality of edge points are detected from an image including an edge of part or the whole of the object as the inspection object,
a representative edge point representing the plurality of edge points present within a reference range having a previously set prescribed width is calculated in each shifted position of the reference range, while the reference range is sequentially shifted,
residuals between a plurality of calculated representative edge points and corresponding edge points are calculated, and
a position and a size of the defect are specified based upon the calculated residuals.

8. The defect detection method according to claim 7, wherein all the edge points detected by the edge-point detecting device and all the corresponding representative edge points are overlapped and displayed on the same positional coordinates.

9. The defect detection method according to claim 7, wherein the calculated residuals are displayed.

10. The defect detection method according to claim 7, wherein weighting factors to be allocated to the edge points are calculated based upon the calculated residuals.

11. The defect detection method according to claim 10, wherein the larger (smaller) the residual is, the smaller (larger) weighting factor is calculated.

12. The defect detection method according to claim 10, wherein the representative edge point is recalculated based upon the calculated weighting factor.

13. A computer program, which is executed in a defect detection apparatus for detecting a defect based upon an image including an edge of an object as an inspection object, wherein the defect detection apparatus is configured to function as:
an edge-point detecting device for detecting a plurality of edge points from an image including an edge of part or the whole of the object as the inspection object;
a representative-edge-point calculating device for calculating a representative edge point representing the plurality of edge points present within a reference range having a previously set prescribed width in each shifted position of the reference range, while sequentially shifting the reference range;
a residual calculating device for calculating residuals between a plurality of calculated representative edge points and corresponding edge points; and
a defect specifying device for specifying a position and a size of the defect based upon the calculated residuals,
wherein said computer program is on a non-transitory computer readable medium and, when executed by a computer, performs the said detecting.

* * * * *